(12) United States Patent
Kishi et al.

(10) Patent No.: US 12,013,060 B2
(45) Date of Patent: Jun. 18, 2024

(54) RING BODY, PIPE FITTING, AND METHOD FOR JOINING PIPES

(71) Applicant: KUBOTA CORPORATION, Osaka (JP)

(72) Inventors: Shozo Kishi, Amagasaki (JP); Keita Oda, Amagasaki (JP); Ryunosuke Tanaka, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/769,099

(22) PCT Filed: Oct. 5, 2020

(86) PCT No.: PCT/JP2020/037731
§ 371 (c)(1),
(2) Date: Apr. 14, 2022

(87) PCT Pub. No.: WO2021/075297
PCT Pub. Date: Apr. 22, 2021

(65) Prior Publication Data
US 2024/0019055 A1    Jan. 18, 2024

(30) Foreign Application Priority Data
Oct. 18, 2019 (JP) .................. 2019-190624

(51) Int. Cl.
*F16L 21/08* (2006.01)
*F16L 21/035* (2006.01)
*F16L 21/04* (2006.01)

(52) U.S. Cl.
CPC ............. *F16L 21/08* (2013.01); *F16L 21/035* (2013.01); *F16L 21/04* (2013.01)

(58) Field of Classification Search
CPC ......... F16L 21/08; F16L 21/035; F16L 21/04; F16L 2201/10
See application file for complete search history.

(56) References Cited

U.S. PATENT DOCUMENTS

| 4,082,321 A * | 4/1978 | Nakajima ............... F16L 21/04 |
| 10,018,290 B2 | 7/2018 | Kishi et al. |

(Continued)

FOREIGN PATENT DOCUMENTS

| CN | 1237682 A | 12/1999 |
| CN | 1421634 A | 6/2003 |

(Continued)

OTHER PUBLICATIONS

JP-2016156479-A—Machine Translation—English (Year: 2016).*

(Continued)

*Primary Examiner* — William S. Choi
(74) *Attorney, Agent, or Firm* — KUSNER & JAFFE

(57) ABSTRACT

A ring body to be provided in a pipe joint which can prevent a spigot from separating from a socket by a spigot protrusion engaging with a lock ring from the back side of the socket in the separation direction A of the spigot. The ring body includes a main body part which is inserted into between the inner peripheral surface of the socket and the outer peripheral surface of the spigot to be provided in the pipe joint, and a deviation prevention member that prevents the main body part from deviating to the opening end side of the socket, wherein the main body part moves the spigot in the pipe radial direction with respect to the socket, thereby reducing deviation in the pipe radial direction between the pipe axis of a first pipe and the pipe axis of a second pipe.

4 Claims, 13 Drawing Sheets

(56) References Cited

U.S. PATENT DOCUMENTS

| | | | | |
|---|---|---|---|---|
| 2014/0035282 A1* | 2/2014 | Kishi | ...................... | F16L 21/04 |
| 2019/0137017 A1 | 5/2019 | Ishihara et al. | | |

FOREIGN PATENT DOCUMENTS

| | | | |
|---|---|---|---|
| CN | 205716124 U | | 11/2016 |
| CN | 108884955 A | | 11/2018 |
| GB | 1249846 A | | 10/1971 |
| JP | 7-260059 A | | 10/1995 |
| JP | H07-260059 A | | 10/1995 |
| JP | 2002-340257 A | | 11/2002 |
| JP | 2008-89095 A | | 4/2008 |
| JP | 4781220 B2 | | 7/2011 |
| JP | 2015-034605 A | | 2/2015 |
| JP | 2016156479 A | * | 9/2016 |
| NL | 6904397 A | | 8/1969 |
| WO | WO2018/001575 A1 | | 1/2018 |

OTHER PUBLICATIONS

Office Action (with English machine translation) issued Jul. 27, 2023 in related/corresponding Chinese Patent Appl. No. 202080070428.7.

International Search Report from corresponding International Patent Application No. PCT/JP20/37731, dated Nov. 10, 2020.

Extended European Search Report dated Oct. 17, 2022 for EP Patent Application No. 20876654.3.

Office Action issued in corresponding Taiwanese Patent Application No. 109135335 dated Nov. 6, 2023 (with English-language machine translation).

* cited by examiner

RING BODY, PIPE FITTING, AND METHOD FOR JOINING PIPES

FIELD OF INVENTION

The present invention relates to a ring body to be provided in a pipe joint having a separation preventive function, a pipe joint including the ring body, and a method for joining pipes.

BACKGROUND OF INVENTION

Conventionally, for example, there is a pipe joint 109 in which a spigot 104 of a first pipe 103 is inserted into a socket 102 of a second pipe 101 as shown in FIG. 12. A lock ring-accommodating groove 105 is formed in the inner circumference of the socket 102, and a lock ring 106 is accommodated in the lock ring-accommodating groove 105. A packing 107 which is to be compressed in the pipe radial direction and thereby seals between the inner peripheral surface of the socket 102 and the outer peripheral surface of the spigot 104 is provided on the opening end side of the socket 102 with respect to the lock ring 106. A spigot protrusion 108 is formed on the outer circumference of the distal end part of the spigot 104. It is possible to prevent the spigot 104 from separating from the socket 102 by the spigot protrusion 108 engaging with the lock ring 106 from the back side of the socket 102 in the separation direction A of the spigot 104.

Further, a press ring 110 that presses the packing 107 to the back side of the socket is provided in an opening end part of the socket 102. The press ring 110 is connected to the opening end part of the socket 102 via a plurality of bolts 11 and nuts 112. Note that the press ring 110 and the opening end face of the socket 102 are not in contact with each other, and a predetermined gap 113 is formed between the press ring 110 and the opening end face of the socket 102.

Further, a backup ring 114 is fitted in between the inner peripheral surface of the socket 102 and the outer peripheral surface of the spigot 104 in a range between the lock ring 106 and the packing 107.

Further, as shown in FIG. 13, when the pipes 101 and 103 are joined together, a spigot insertion jig 116 is used. This spigot insertion jig 116, which is an expandable ring having a split structure in which one portion is cut, has an inclined surface 117.

A method for joining pipes by using the spigot insertion jig 116 will be described below.

First, as shown in FIG. 13, with the lock ring 106 being set in the lock ring-accommodating groove 105, the spigot insertion jig 116 is fitted on the outer circumference of the spigot 104. Thereafter, as shown in FIG. 14, when the spigot 104 is inserted into the socket 102, as a result of the inclined surface 117 of the spigot insertion jig 116 coming into abutment against a packing abutting face 118 of the socket 102, the spigot 104 moves in the pipe radial direction with respect to the socket 102. Thereby, deviation in the pipe radial direction between the pipe axis of the first pipe 103 and the pipe axis of the second pipe 101 is reduced so that centering of the spigot 104 with respect to the socket 102 is automatically performed.

Further, when the spigot 104 is inserted, the spigot protrusion 108 expands the lock ring 106 in diameter, and when the spigot protrusion 108 passes through the lock ring 106 to reach the back side of the socket 102, the lock ring 106 is reduced in diameter to cling to the outer circumference of the spigot 104.

Thereafter, the spigot insertion jig 116 is expanded in diameter and removed from the spigot 104. Next, as shown in FIG. 12, the backup ring 114 and the packing 107 are inserted into between the outer circumference of the spigot 104 and the inner circumference of the socket 102, and the bolt 111 and the nut 112 are tightened to press the packing 107 toward the back side of the socket with the press ring 110. As a result of this, the first pipe 103 and the second pipe 101 are connected to each other.

According to this, the gap between the outer circumference of the spigot 104 and the inner circumference of the socket 102 is sealed by the packing 107. Moreover, by the spigot protrusion 108 engaging with the lock ring 106 from the back side of the socket in the separation direction A of the spigot 104, it is possible to prevent the spigot 104 from separating from the socket 102.

Moreover, even if the bolt 111 and the nut 112 are excessively tightened erroneously so that the press ring 110 presses the packing 107 by excessive force to the back side of the socket, since the backup ring 114 is fixed between the outer circumference of the spigot 104 and the inner circumference of the socket 102, the movement of the packing 107 to the back side of the socket is prevented by the backup ring 114 so that the back end part of the packing 107 will not come into contact with the lock ring 106.

Note that the pipe joint 109 and the spigot insertion jig 116 as described above may be referred to in Japanese Patent Laid-Open No. 2002-340257.

However, in a conventional system as described above, when the pipes 101 and 103 are joined together, it is necessary that as shown in FIGS. 13 and 14, the spigot insertion jig 116 is once attached to the spigot 104 to insert the spigot 104 into the socket 102, and after deviation in the pipe radial direction between the pipe axis of the first pipe 103 and the pipe axis of the second pipe 101 is reduced, the spigot insertion jig 116 is finally removed from the spigot 104. Thus, the work of joining the pipes 101 and 103 disadvantageously takes much time and effort.

SUMMARY OF INVENTION

It is an object of the present invention to provide a ring body, a pipe joint, and a method for joining pipes, for enabling to reduce the time and effort needed for the work of joining pipes.

Solution to Problem

A ring body, which is to be provided in a pipe joint, the pipe joint including:
- a spigot of a first pipe to be inserted into a socket of a second pipe;
- a lock ring-accommodating groove formed in an inner circumference of the socket;
- a lock ring accommodated in the lock ring-accommodating groove;
- a seal ring that is provided on an opening end side of the socket with respect to the lock ring and is compressed in a pipe radial direction to seal between an inner peripheral surface of the socket and an outer peripheral surface of the spigot; and
- a spigot protrusion provided on an outer circumference of the spigot, the pipe joint being capable of preventing the spigot from separating from the socket by a spigot protrusion engaging with the lock ring from a back side of the socket in the separation direction of the spigot, includes:

a main body part that is inserted into between the inner peripheral surface of the socket and the outer peripheral surface of the spigot to be provided in the pipe joint, and a deviation prevention member that prevents the main body part from deviating to the opening end side of the socket, wherein the main body part moves the spigot in the pipe radial direction with respect to the socket, thereby reducing deviation in the pipe radial direction between a pipe axis of the first pipe and a pipe axis of the second pipe.

According to this, by inserting the ring body into between the inner peripheral surface of the socket and the outer peripheral surface of the spigot with the spigot being inserted into the socket, the main body part of the ring body moves the spigot in the pipe radial direction thereby reducing deviation in the pipe radial direction between the pipe axis of the first pipe and the pipe axis of the second pipe. This enables to perform centering of the pipes.

Further, since the ring body is disposed in the pipe joint, it is possible to join the first pipe and the second pipe with the ring body being provided between the inner peripheral surface of the socket and the outer peripheral surface of the spigot. And even after joining, the ring body remains to be provided between the inner peripheral surface of the socket and the outer peripheral surface of the spigot, it is not necessary to remove the ring body to the outside through between the inner peripheral surface of the socket and the outer peripheral surface of the spigot. This makes it possible to reduce the time and effort needed for the work of joining pipes.

Moreover, it is possible, by the deviation prevention member, to prevent the main body part of the ring body from deviating to the opening end side of the socket through between the inner peripheral surface of the socket and the outer peripheral surface of the spigot.

According to the ring body of the present invention, in the deviation prevention member, preferably, the distal end part in the pipe axis direction is abuttable against the inner peripheral surface of the socket, and the base end part in the pipe axis direction is provided on the inner circumference side of the main body part.

According to this, even if the spigot moves in the separation direction with respect to the socket, the deviation prevention member stretches between the inner peripheral surface of the socket and the main body part of the ring body with the distal end part of the deviation prevention member abutting against the inner peripheral surface of the socket. Therefore, it is possible to prevent the main body part of the ring body from deviating to the opening end side of the socket (to the side of the separation direction).

In the pipe joint including the above described ring body of the present invention, the ring body is fitted into between the inner peripheral surface of the socket and the outer peripheral surface of the spigot.

According to the pipe joint of the present invention, it is preferable that the distal end part of the deviation prevention member of the ring body is in abutment against the inner peripheral surface of the socket.

This makes it possible to prevent the main body part of the ring body from deviating to the opening end side of the socket through between the inner peripheral surface of the socket and the outer peripheral surface of the spigot, by the distal end part of the deviation prevention member abutting against the inner peripheral surface of the socket.

According to the pipe joint of the present invention, it is preferable that a seal ring insertion space is formed over the entire circumference between the inner peripheral surface of the socket and the outer peripheral surface of the spigot on the opening end side of the socket with respect to the ring body, the seal ring is inserted into the seal ring insertion space, the inner peripheral surface of the socket has a socket protrusion protruding inward in the pipe radial direction between the lock ring-accommodating groove and the seal ring insertion space in the pipe axis direction, and the main body part of the ring body is inserted into between the inner peripheral surface of the socket protrusion and the outer peripheral surface of the spigot.

According to the pipe joint of the present invention, it is preferable that a press ring that presses the seal ring to the back side of the socket is provided at the opening end part of the socket, the press ring abuts against the opening end face of the socket in the pressing direction to press the seal ring, the ring body is provided between the lock ring and the seal ring in the pipe axis direction, and a gap is formed between the seal ring and the ring body in the pipe axis direction.

According to this, as a result of abutting against the opening end face of the socket, the press ring cannot press the seal ring further to the back side of the socket. As a result, the seal ring will not be pressed into the back side of the socket with excessive pressing force, and the back end part of the seal ring will not abut against the ring body, thus making it possible to prevent damages of the ring body.

The method for joining pipes in the above described pipe joint according to the present invention, includes:

setting a lock ring in the lock ring-accommodating groove of the socket of the second pipe, inserting the spigot of the first pipe into the socket, and passing the spigot protrusion from the opening end side of the socket to the back side of the socket at the lock ring, reducing the diameter of the lock ring such that the lock ring clings to the outer circumference of the spigot, moving the ring body which has been externally fitted over the first pipe in advance, in the pipe axis direction, and inserting the ring body through the opening end part of the socket into between the inner peripheral surface of the socket and the outer peripheral surface of the spigot, and pressing the seal ring from the opening end part of the socket into between the inner peripheral surface of the socket and the outer peripheral surface of the spigot.

According to this, by the ring body being moved in the pipe axis direction to be inserted through the opening end part of the socket into between the inner peripheral surface of the socket and the outer peripheral surface of the spigot, the main body part of the ring body moves the spigot in the pipe radial direction, thereby reducing deviation in the pipe radial direction between the pipe axis of the first pipe and the pipe axis of the second pipe.

Thereafter, by pressing the seal ring through the opening end part of the socket into between the inner peripheral surface of the socket and the outer peripheral surface of the spigot, it is possible to join the first pipe and the second pipe together with the ring body being provided in between the inner peripheral surface of the socket and the outer peripheral surface of the spigot. According to this, it is not necessary to remove the ring body to the outside through between the inner peripheral surface of the socket and the outer peripheral surface of the spigot, and therefore it is possible to reduce the time and effort needed for the work of joining pipes together.

Advantageous Effects of Invention

As described above, according to the present invention, the first pipe and the second pipe can be joined with the ring body being provided in the pipe joint so that the ring body remains in between the inner peripheral surface of the socket and the outer peripheral surface of the spigot even after joining. Thus, it is not necessary to remove the ring body to the outside through between the inner peripheral surface of the socket and the outer peripheral surface of the spigot. This enables to reduce the time and effort needed for the work of joining pipes.

DETAILED DESCRIPTION OF INVENTION

Hereinafter, embodiments of the present invention will be described with reference to the drawings.

Figure 1:
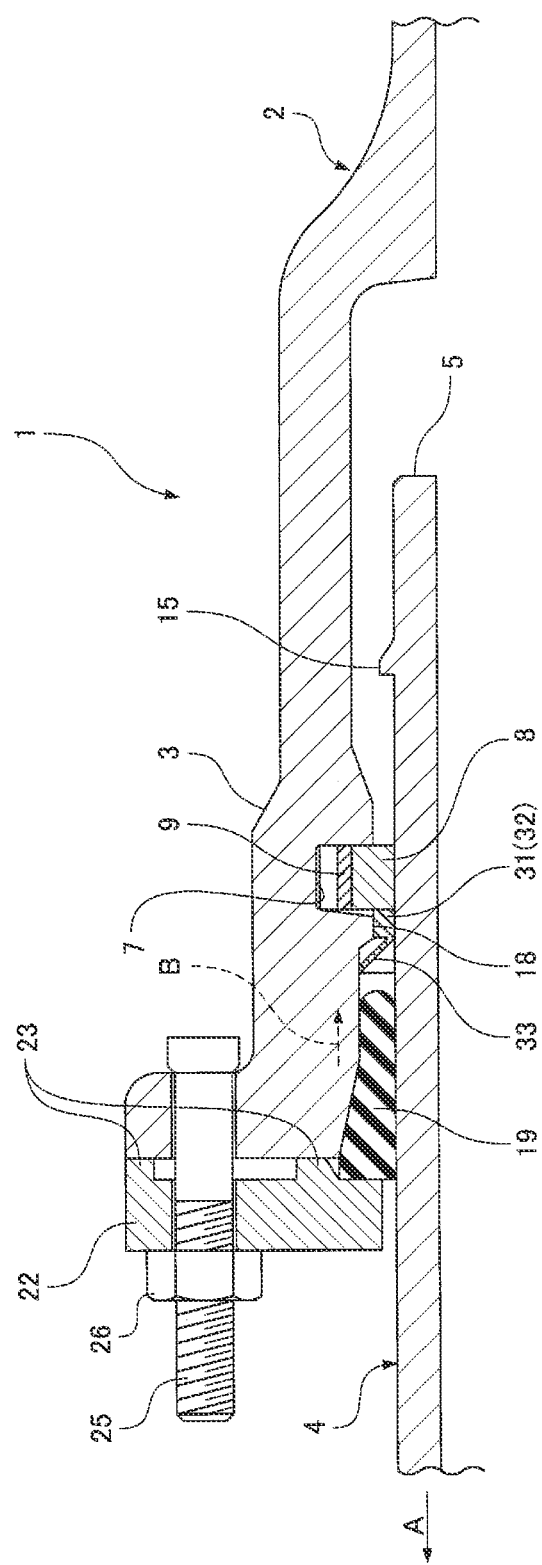
FIG. 1 is a sectional view of a pipe joint according to an embodiment of the present invention.

As shown in FIG. 1, in a pipe joint 1 which has a separation preventive function, a spigot 5 of a first pipe 4 is inserted into a socket 3 of a second pipe 2. Note that for example, ductile iron pipes are used for these pipes 2 and 4.

A lock ring-accommodating groove 7 is formed over the entire circumference in the inner peripheral surface of the socket 3. The lock ring-accommodating groove 7 accommodates a lock ring 8, and an annular press member 9 which presses the lock ring 8 inwardly in the pipe radial direction.

Figure 2:
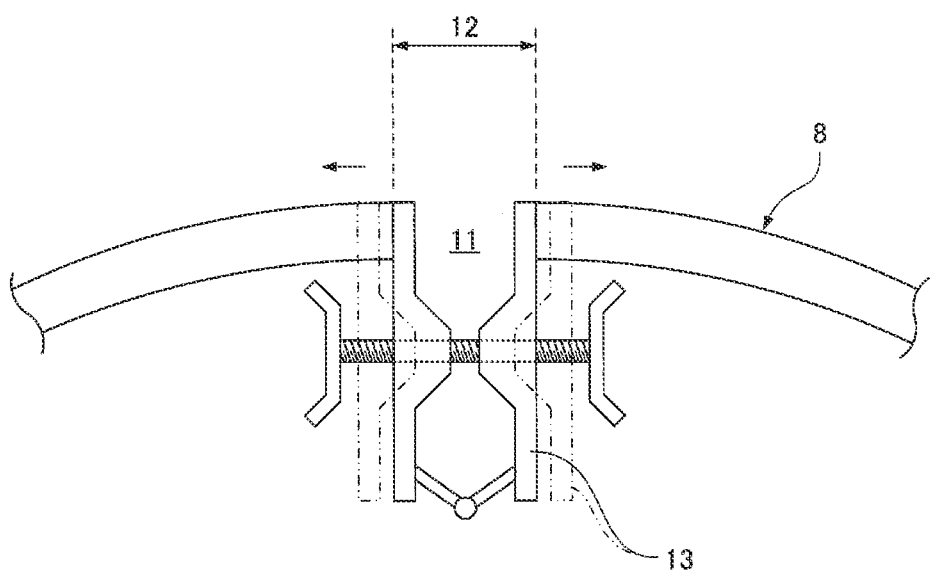
FIG. 2 shows a lock ring when its diameter is expanded, the lock ring being to be provided in the pipe joint according to the same.

As shown in FIG. 2, the lock ring 8 is a ring having a split structure in which one portion thereof is cut, and its diameter is expanded by expanding the width 12 of the cut portion 11 with an expander 13. And the lock ring 8 has elasticity such that its diameter is reduced to return to the original diameter by removing the expander 13 through the cut portion 11.

As shown in FIG. 1, a spigot protrusion 15 is formed on the outer circumference of the spigot 5 over the entire circumference. It is possible to prevent the spigot 5 from separating from the socket 3 by the spigot protrusion 15 engaging with the lock ring 8 from the back side of the socket in the separation direction A of the spigot 5.

Figure 8:
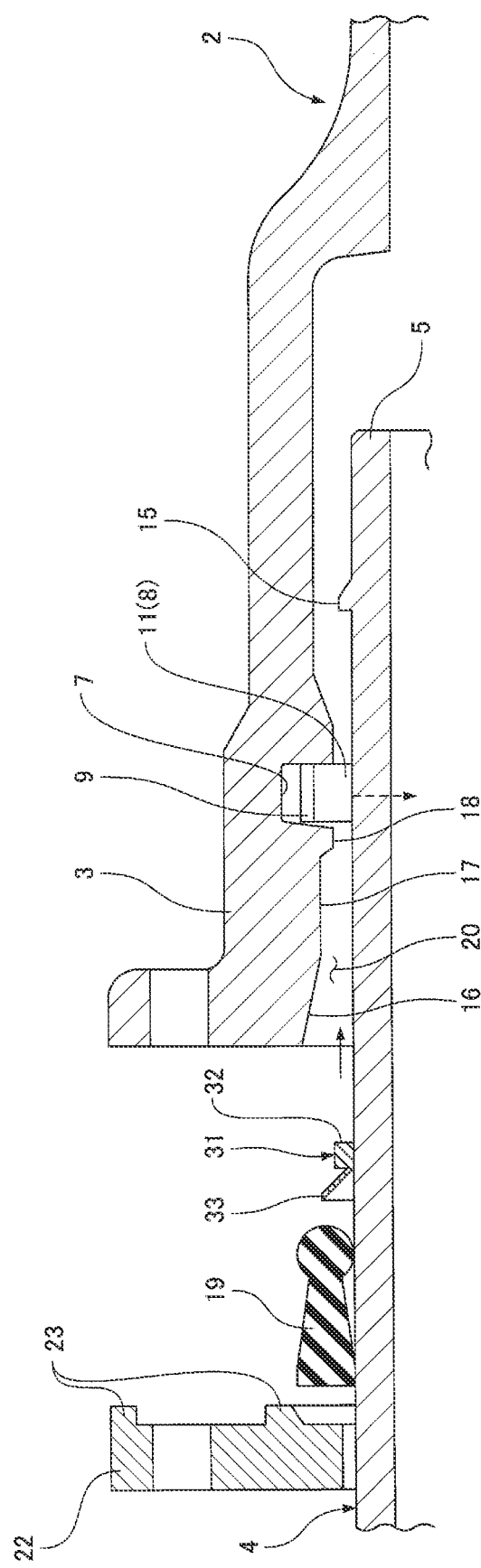
FIG. 8 is a sectional view to show the method of joining pipes in the pipe joint according to the same.

As shown in FIG. 8, the inner peripheral surface of the socket 3 includes a tapered section 16 which is gradually reduced in diameter from an opening end face to the back side of the socket 3, a straight section 17 which extends straight from the back end of the tapered section 16 to the back side, and a socket protrusion 18 which protrudes inward from the back end of the straight section 17 in the pipe radial direction. The straight section 17 is formed to have a constant inner diameter in the pipe axis direction. The socket protrusion 18 is provided over the entire circumference between the straight section 17 and the lock ring-accommodating groove 7 in the pipe axis direction, and has a smaller inner diameter than that of the straight section 17.

As shown in FIG. 1, on the side of the socket opening end with respect to the lock ring 8, a seal ring 19 which is compressed in the pipe radial direction to seal between the inner peripheral surface of the socket 3 and the outer peripheral surface of the spigot 5 is provided. The seal ring 19 is a ring made of rubber (a rubber ring) and is inserted into a seal ring insertion space 20. Note that the seal ring insertion space 20 is, as shown in FIG. 8, formed on the entire circumference between the tapered section 16 and straight section 17 of the socket 3, and the outer peripheral surface of the spigot 5. Moreover, the socket protrusion 18 is positioned between the lock ring-accommodating groove 7 and the seal ring insertion space 20 in the pipe axis direction.

As shown in FIG. 1, a press ring 22 for pressing the seal ring 19 to the back side of the socket is provided at the opening end part of the socket 3. The press ring 22 has an abutting part 23 that abuts against the opening end face of the socket 3 in the pressing direction B in which it presses the seal ring 19, and is connected to the opening end part of the socket 3 by a plurality of bolts 25 and nuts 26.

Figure 3:
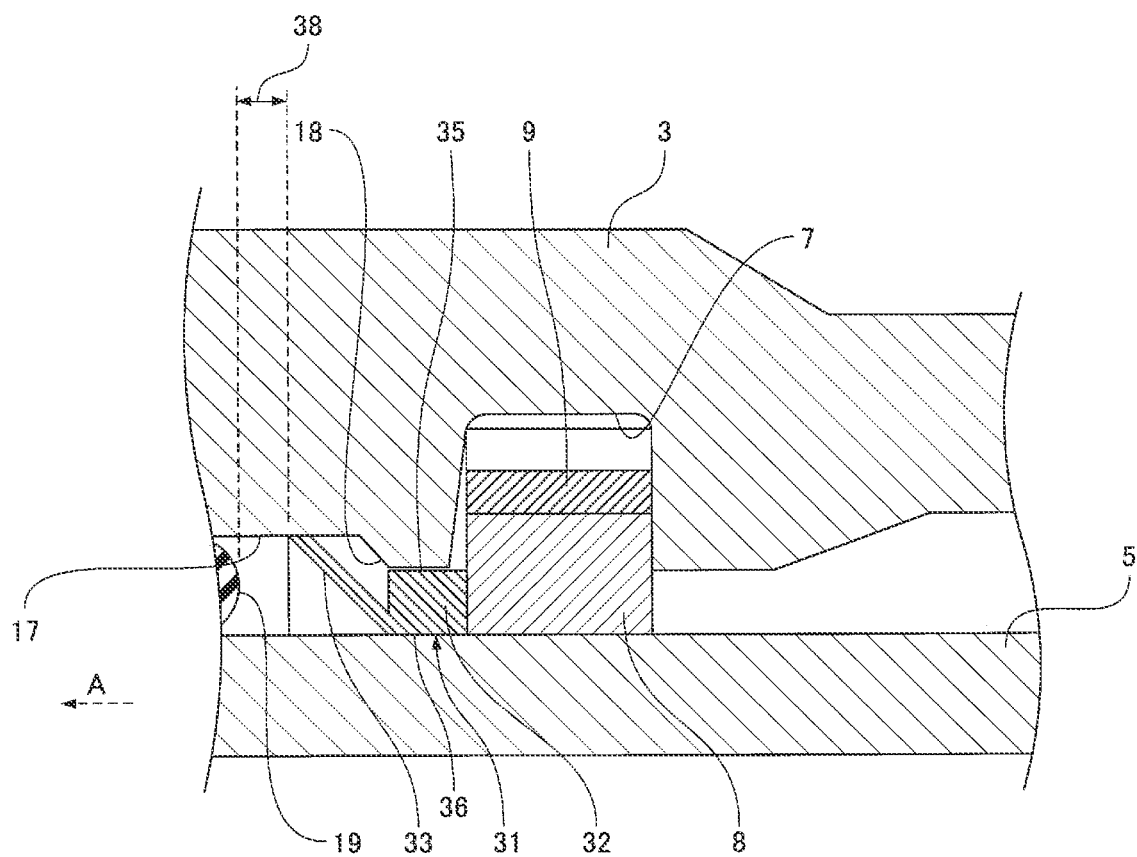
FIG. 3 is a partial enlarged sectional view of a pipe joint according to the same.
Figure 4:
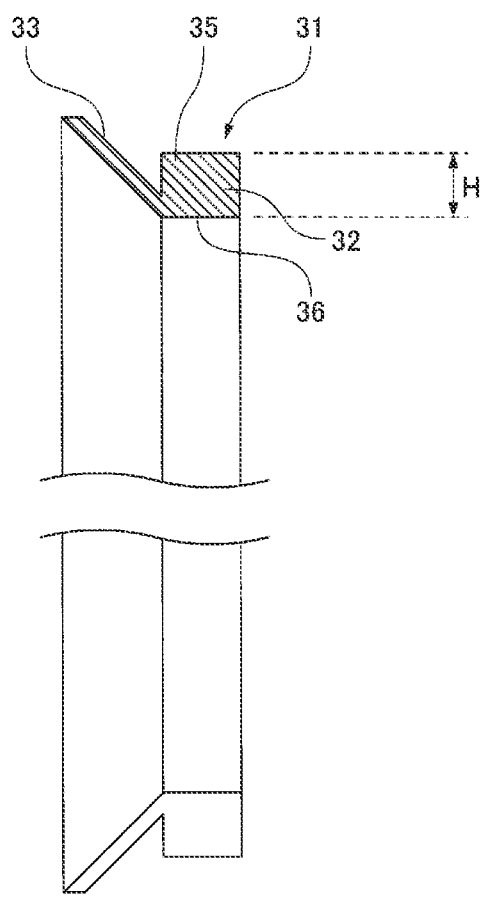
FIG. 4 is a sectional view of a ring body to be provided in the pipe joint according to the same.
Figure 5:
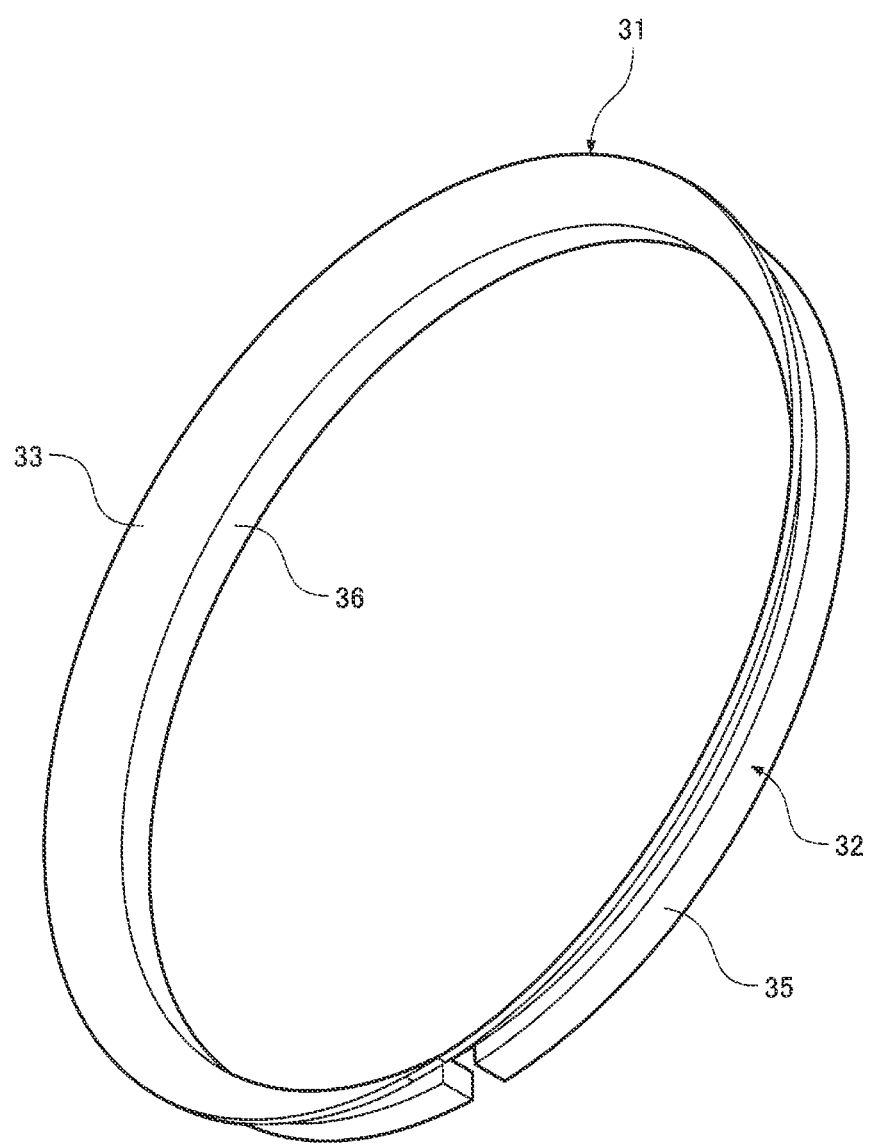
FIG. 5 is a perspective view of the ring body to be provided in the pipe joint according to the same.

A ring body 31 is provided between the lock ring 8 and the seal ring 19 in the pipe axis direction. As shown in FIGS. 3 to 5, the ring body 31, which is a ring having a split structure in which one portion is cut, is made of a material such as elastic resin. The ring body 31 has an annular main body part 32 having a split structure, and a deviation prevention member 33 for preventing the main body part 32 from deviating toward the opening end side of the socket 3.

The main body part 32 has a rectangular cross sectional shape, and is inserted into between the inner peripheral surface of the socket protrusion 18 and the outer peripheral surface of the spigot 5, thereby moving the spigot 5 in the pipe radial direction with respect to the socket 3 so that deviation in the pipe radial direction between a pipe axis 28 of the first pipe 4 (see FIG. 11) and a pipe axis 29 of the second pipe 2 (see FIG. 11) is reduced.

Note that while the sectional shape of the main body part 32 is not limited to a rectangular shape alone, it is preferable that the outer peripheral surface 35 and the inner peripheral surface 36 of the main body part 32 are parallel to each other. In such a case, it is possible to stably provide the main body part 32 in between the inner peripheral surface of the socket protrusion 18 and the outer peripheral surface of the spigot 5.

Moreover, a height H in the radial direction from the inner peripheral surface 36 to the outer peripheral surface 35 of the main body part 32 is set to less than a half value of the difference between the allowable minimum value of the inner diameter of the socket protrusion 18 and the allowable maximum value of the outer diameter of the spigot 5.

In the deviation prevention member 33, the distal end part in the pipe axis direction is abuttable against the straight section 17 of the inner peripheral surface of the socket 3, and the base end part in the pipe axis direction is integrally provided on the inner circumferential side of the main body part 32. The deviation prevention member 33 has a ring shape that expands in diameter in a conical shape from the base end part to the distal end part, and also has a split structure.

A gap 38 is formed over the entire circumference between the seal ring 19 and the ring body 31 in the pipe axis direction.

Hereinafter, description will be made on a method for joining the pipes 2 and 4 in the pipe joint 1 as described above.

Figure 6:
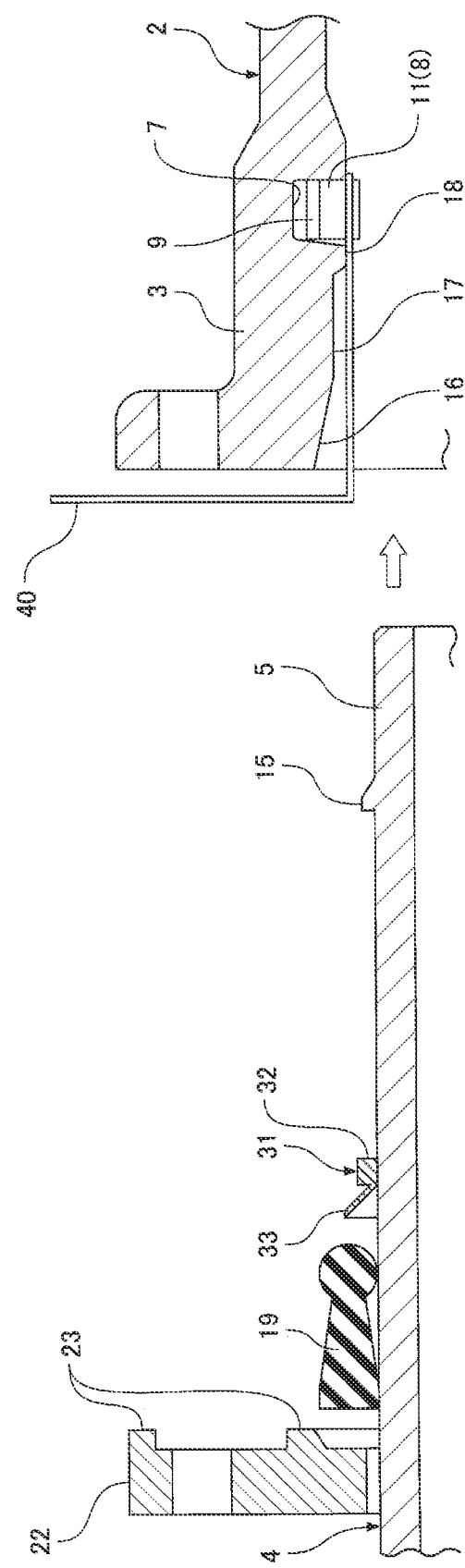
FIG. 6 is a sectional view to show a method of joining pipes in the pipe joint according to the same.

As shown in FIG. 6, in advance, the ring body 31, the seal ring 19, and the press ring 22 are externally fitted to the first pipe 4. Then, the press member 9 and the lock ring 8 are accommodated in the lock ring-accommodating groove 7 of the second pipe 2. Then, as shown in FIG. 2, a width 12 of the cut portion 11 of the lock ring 8 is expanded by an expander 13 to expand the diameter of the lock ring 8. Next, as shown in FIG. 6, an L-shaped diameter expansion holder 40 is inserted into the cut portion 11 of the lock ring 8, and the expander 13 is removed to keep the lock ring 8 in a diameter expanded state.

Figure 7:
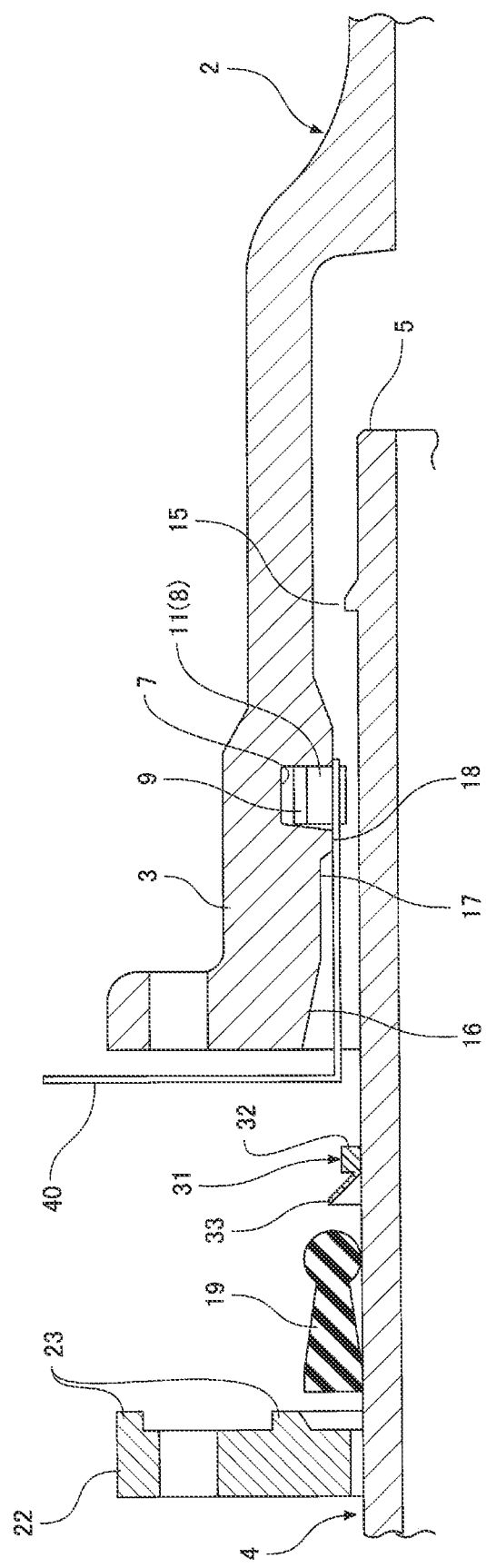
FIG. 7 is a sectional view to show the method of joining pipes in the pipe joint according to the same.

Thereafter, as shown in FIG. 7, the spigot 5 is inserted into the socket 3 so that the spigot protrusion 15 is passed through from the opening end side of the socket 3 to the back side of the socket 3 at the lock ring 8. At this moment, since the lock ring 8 is maintained in a diameter expanded state by the diameter expansion holder 40, the spigot protrusion 15 easily passes through the inside of the lock ring 8.

Next, as shown in FIG. 8, the diameter expansion holder 40 is removed to reduce the diameter of the lock ring 8. As a result of this, the lock ring 8 clings to the outer circumference of the spigot 5.

Figure 9:
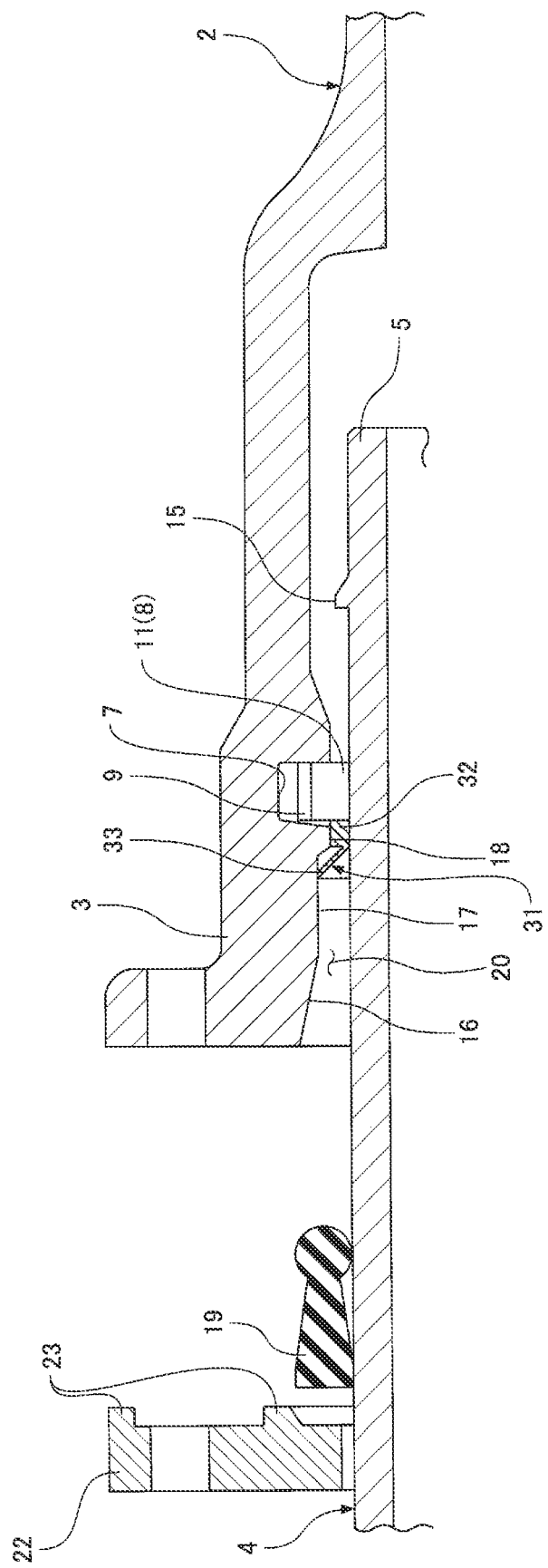
FIG. 9 is a sectional view to show the method of joining pipes in the pipe joint according to the same, in which a section of an upper part of the pipe joint is shown.
Figure 11:
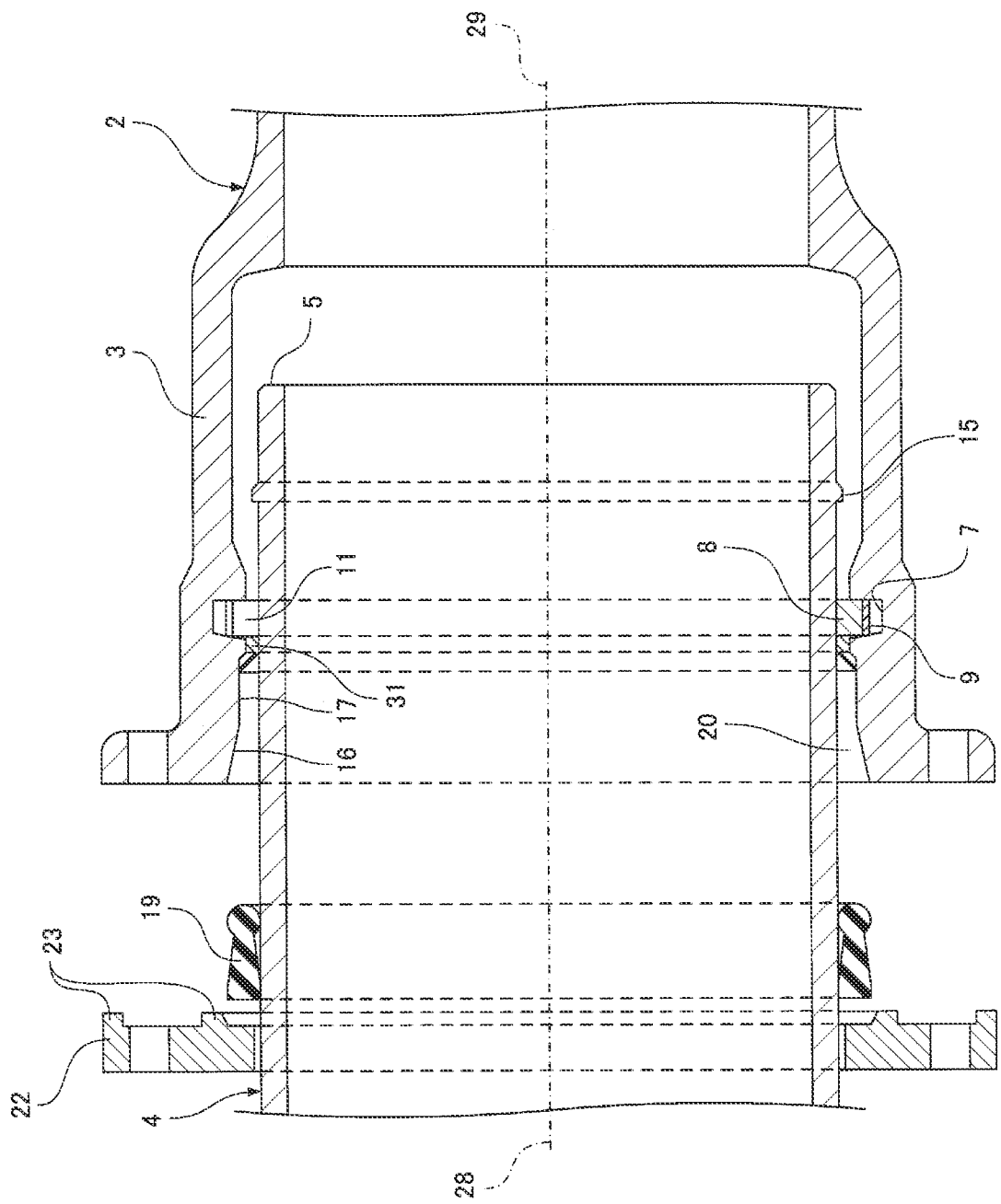
FIG. 11 is a sectional view to show the method of joining pipes in the pipe joint according to the same, in which a section of the entire pipe joint is shown.
Figure 12:
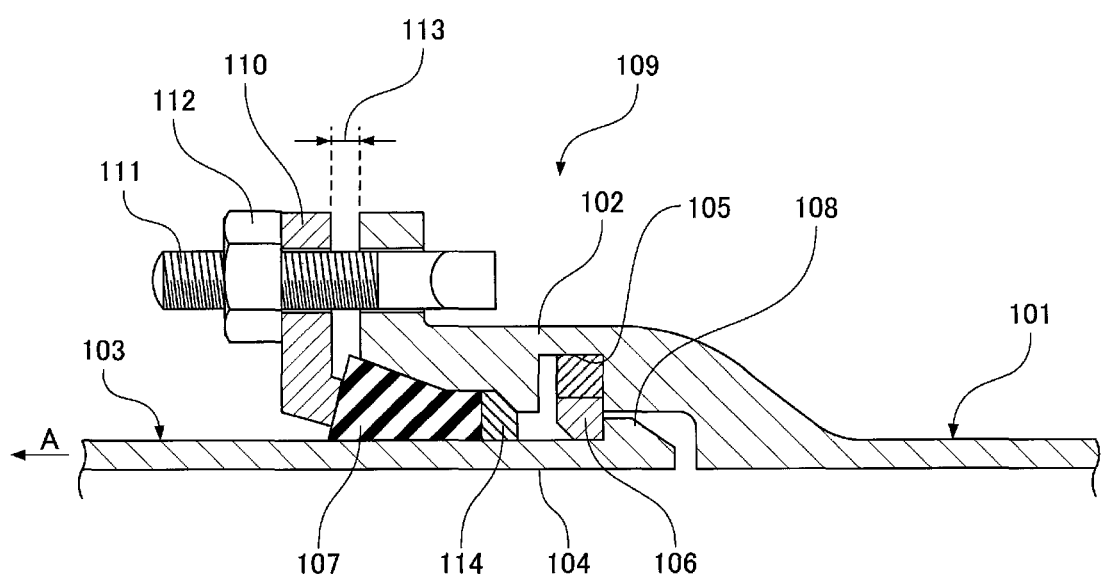
FIG. 12 is a sectional view of a conventional pipe joint.
Figure 13:
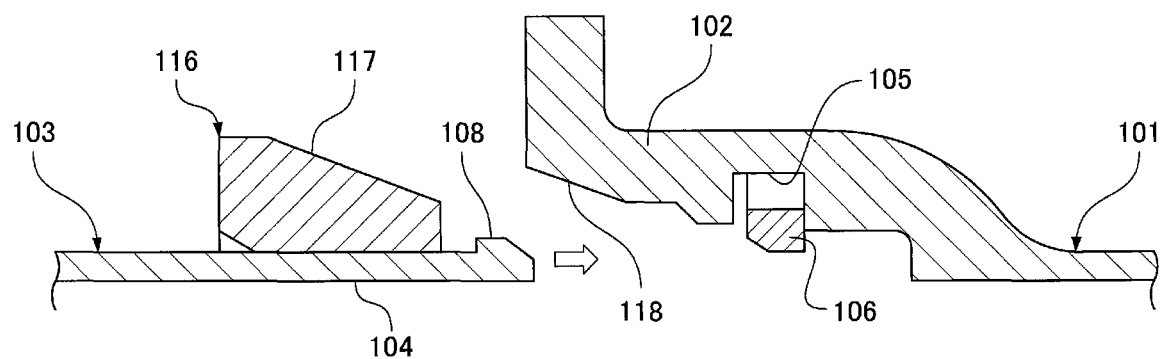
FIG. 13 is a sectional view to show the method of joining pipes in the conventional pipe joint.
Figure 14:
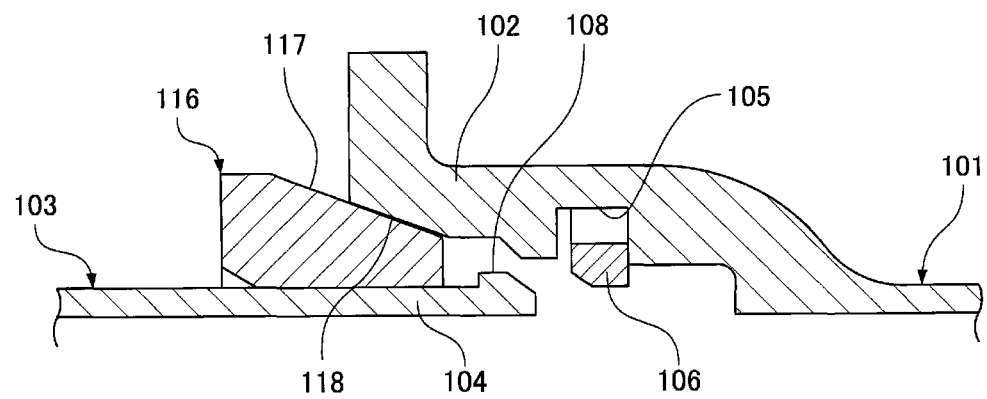
FIG. 14 is a sectional view to show the method of joining pipes in the conventional pipe joint.

Thereafter, as shown in FIG. 9, the ring body 31 is moved in the pipe axis direction, to be pressed, through the opening end part of the socket 3, into between the inner peripheral surface of the socket 3 and the outer peripheral surface of the spigot 5, and is inserted into between the inner peripheral surface of the socket protrusion 18 and the outer peripheral surface of the spigot 5. As a result, as shown in FIG. 11, the main body part 32 of the ring body 31 moves the spigot 5 in the pipe radial direction to reduce deviation in the pipe radial direction between the pipe axis 28 of the first pipe 4 and the pipe axis 29 of the second pipe 2. For that reason, the pipe axis 28 of the first pipe 4 approximately coincides with the pipe axis 29 of the second pipe 2, thus enabling to perform centering of the pipes 2 and 4.

For example, when the pipe axis 28 of the first pipe 4 is deviated upward with respect to the pipe axis 29 of the second pipe 2 in a stage before the ring body 31 is inserted into between the inner peripheral surface of the socket protrusion 18 and the outer peripheral surface of the spigot 5, as shown in FIG. 9, it is possible by inserting the ring body 31 into between the inner peripheral surface of the socket protrusion 18 and the outer peripheral surface of the spigot 5 to move the spigot 5 downward with respect to the socket 3, thereby reducing deviation in the pipe radial direction between the pipe axis 28 of the first pipe 4 and the pipe axis 29 of the second pipe 2.

At this moment, at least in the upper part of the pipe joint 1, the outer peripheral surface 35 of the main body part 32 abuts against the inner peripheral surface of the socket protrusion 18, as well as the inner peripheral surface 36 of the main body part 32 abuts against the outer peripheral surface of the spigot 5. Further, as shown in FIG. 10, in the lower part of the pipe joint 1, a slight gap may be formed between the outer peripheral surface 35 of the main body part 32 and the inner peripheral surface of the socket protrusion 18, or a slight gap may be formed between the inner peripheral surface 36 of the main body part 32 and the outer peripheral surface of the spigot 5.

Moreover, in contrast to the above, when the pipe axis 28 of the first pipe 4 is deviated downward with respect to the pipe axis 29 of the second pipe 2, it is possible by inserting the ring body 31 into between the inner peripheral surface of the socket protrusion 18 and the outer peripheral surface of the spigot 5 to move the spigot 5 upward with respect to the socket 3, thereby reducing deviation in the pipe radial direction between the pipe axis 28 of the first pipe 4 and the pipe axis 29 of the second pipe 2.

At this moment, at least in the lower part of the pipe joint 1, the outer peripheral surface 35 of the main body part 32 abuts against the inner peripheral surface of the socket protrusion 18, as well as the inner peripheral surface 36 of the main body part 32 abuts against the outer peripheral surface of the spigot 5. Further, in the upper part of the pipe joint 1, a slight gap may be formed between the outer peripheral surface 35 of the main body part 32 and the inner peripheral surface of the socket protrusion 18, or a slight gap may be formed between the inner peripheral surface 36 of the main body part 32 and the outer peripheral surface of the spigot 5.

Figure 10:
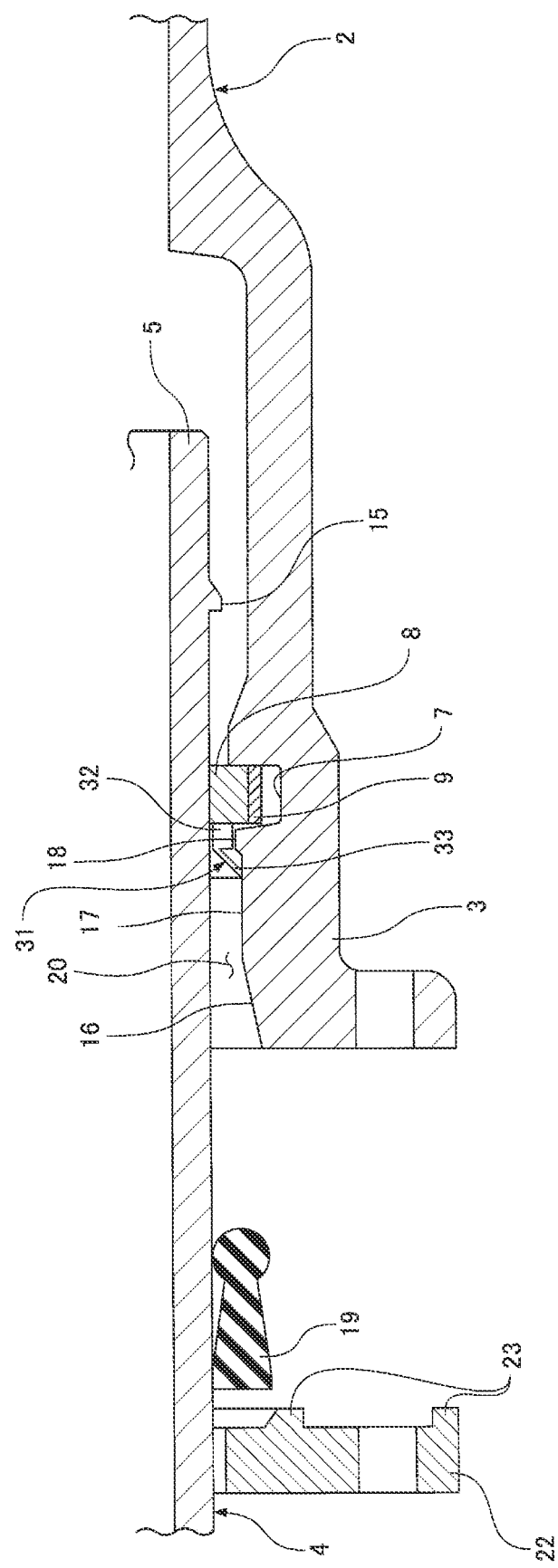
FIG. 10 is a sectional view to show the method of joining pipes in the pipe joint according to the same, in which a section of a lower part of the pipe joint is shown.

Moreover, as shown in FIGS. 9 and 10, it is possible by the main body part 32 of the ring body 31 abutting against the lock ring 8 in the pipe axis direction, to prevent the ring body 31 from separating through between the inner peripheral surface of the socket protrusion 18 and the outer peripheral surface of the spigot 5 to the back side of the socket, and to stably insert the ring body 31 into between the inner peripheral surface of the socket protrusion 18 and the outer peripheral surface of the spigot 5.

In this way, after centering of the pipes 2 and 4 is performed, as shown in FIG. 1, the seal ring 19 is inserted into the seal ring insertion space 20 from the opening end part of the socket 3, the press ring 22 is connected to the opening end part of the socket 3 by using the bolt 25 and the nut 26, and the bolt 25 and the nut 26 are tightened until the abutting part 23 of the press ring 22 abuts against the opening end face of the socket 3. As a result of this, the seal ring 19 is pressed into the seal ring insertion space 20 to be compressed in the pipe radial direction.

In this way, as a result of mounting the seal ring 19 in the seal ring insertion space 20, the pipe axis 28 of the first pipe 4 coincides with the pipe axis 29 of the second pipe 2 further accurately. In this state, as shown in FIG. 3, a slight gap is formed between the outer peripheral surface 35 of the main body part 32 of the ring body 31 and the inner peripheral surface of the socket protrusion 18.

Since the ring body 31 is provided in between the lock ring 8 and the seal ring 19 in the pipe axis direction, the first pipe 4 and the second pipe 2 can be joined with the ring body 31 being inserted in between the inner peripheral surface of the socket protrusion 18 and the outer peripheral surface of the spigot 5. And even after joining, the ring body 31 remains to be fitted in between the inner peripheral surface of the socket protrusion 18 and the outer peripheral surface of the spigot 5, and it is not necessary to remove the ring body 31 to the outside through between the inner peripheral surface of the socket 3 and the outer peripheral surface of the spigot 5. This makes it possible to reduce the time and effort needed for the work of joining the pipes 2 and 4.

Moreover, when the spigot 5 moves in the separation direction A with respect to the socket 3 as shown in FIG. 1, since the deviation prevention member 33 stretches between the inner peripheral surface of the socket 3 and the main body part 32 of the ring body 31 in a state in which the distal end part of the deviation prevention member 33 abuts against the straight section 17 of the inner peripheral surface of the socket 3, it is possible to prevent the main body part 32 of the ring body 31 from deviating to the opening end side (the separation direction A) of the socket 3 through between the inner peripheral surface of the socket protrusion 18 and the outer peripheral surface of the spigot 5.

Note that although the distal end part of the deviation prevention member 33 preferably abuts against the straight section 17 of the inner peripheral surface of the socket 3 over the entire circumference, a portion in the circumferential direction of the distal end part of the deviation prevention member 33 may be separated from the straight section 17 of the inner peripheral surface of the socket 3.

Moreover, when the spigot 5 moves in the insertion direction (the opposite direction to the separation direction A), since the main body part 32 of the ring body 31 abuts against the lock ring 8 as shown in FIG. 3, it is possible to prevent the main body part 32 from deviating to the back side (the opposite direction to the separation direction A) of the socket through between the inner peripheral surface of the socket protrusion 18 and the outer peripheral surface of the spigot 5.

Moreover, as shown in FIG. 1, as a result of the abutting part 23 of the press ring 22 abutting against the opening end face of the socket 3, it is not possible for the press ring 22 to further press the seal ring 19 to the back side of the socket. As a result of this, since the seal ring 19 will not be pressed to the back side of the socket with excessive pressing force, and the back end part of the seal ring 19 will not abut against the ring body 31, it is possible to prevent damage of the ring body 31.

In the embodiment described above, the socket protrusion 18 is formed in the inner peripheral surface of the socket 3 and thereby it is possible, by inserting the ring body 31 into between the inner peripheral surface of the socket protrusion 18 and the outer peripheral surface of the spigot 5, to easily perform the work of mounting the ring body 31. However, the socket 3 may be a type in which the socket protrusion 18 is not formed.

What is claimed is:

1. An assembly, comprising:
    a ring body; and
    a pipe joint in which the ring body is provided, the pipe joint comprising:
        a spigot of a first pipe to be inserted into a socket of a second pipe;
        a lock ring-accommodating groove formed in an inner circumference of the socket;
        a lock ring accommodated in the lock ring-accommodating groove;
        a seal ring that is provided on an opening end side of the socket with respect to the lock ring and is compressed in a pipe radial direction to seal between an inner peripheral surface of the socket and an outer peripheral surface of the spigot; and
        a spigot protrusion provided on an outer circumference of the spigot, the pipe joint being capable of preventing the spigot from separating from the socket by the spigot protrusion engaging with the lock ring from a back side of the socket in a separation direction of the spigot,
    wherein the ring body comprises:
        a main body part that is inserted into between the inner peripheral surface of the socket and the outer peripheral surface of the spigot to be provided in the pipe joint; and
        a deviation prevention member that prevents the main body part from deviating to the opening end side of the socket, the deviation prevention member having a ring shape that expands in diameter in a conical shape,
    wherein the main body part moves the spigot in the pipe radial direction with respect to the socket, thereby reducing deviation in the pipe radial direction between a pipe axis of the first pipe and a pipe axis of the second pipe,
    wherein the ring body is fitted into between the inner peripheral surface of the socket and the outer peripheral surface of the spigot,
    wherein a press ring that presses the seal ring to the back side of the socket is provided at an opening end part of the socket,
    wherein the press ring abuts against an opening end face of the socket in a pressing direction to press the seal ring,
    wherein the ring body is provided between the lock ring and the seal ring in the pipe axis direction, and
    wherein a gap is formed over an entire circumference between the seal ring and the ring body in the pipe axis direction such that the seal ring does not abut against the ring body.

2. The assembly according to claim 1, wherein the distal end part of the deviation prevention member of the ring body is in abutment against the inner peripheral surface of the socket.

3. The assembly according to claim 1, wherein a seal ring insertion space is formed over an entire circumference between the inner peripheral surface of the socket and the outer peripheral surface of the spigot on the opening end side of the socket with respect to the ring body,
    wherein the seal ring is inserted into the seal ring insertion space,
    wherein the inner peripheral surface of the socket has a socket protrusion protruding inward in the pipe radial direction between the lock ring-accommodating groove and the seal ring insertion space in the pipe axis direction, and
    wherein the main body part of the ring body is inserted into between the inner peripheral surface of the socket protrusion and the outer peripheral surface of the spigot.

4. A method for joining pipes, the method comprising:
    providing the assembly according to claim 1;
    setting the lock ring in the lock ring accommodating groove of the socket of the second pipe, inserting the spigot of the first pipe into the socket, and passing the spigot protrusion from the opening end side of the socket to the back side of the socket at the lock ring, reducing the diameter of the lock ring such that the lock ring clings to the outer circumference of the spigot, moving the ring body which has been externally fitted over the first pipe in advance, in the pipe axis direction, and inserting the ring body through an opening end part of the socket into between the inner peripheral surface of the socket and the outer peripheral surface of the spigot, and pressing the seal ring from the opening end part of the socket into between the inner peripheral surface of the socket and the outer peripheral surface of the spigot.

* * * * *